July 1, 1930.    L. E. GODDU    1,769,684
SEPARABLE FASTENER
Filed Oct. 30, 1928
Fig. 1.
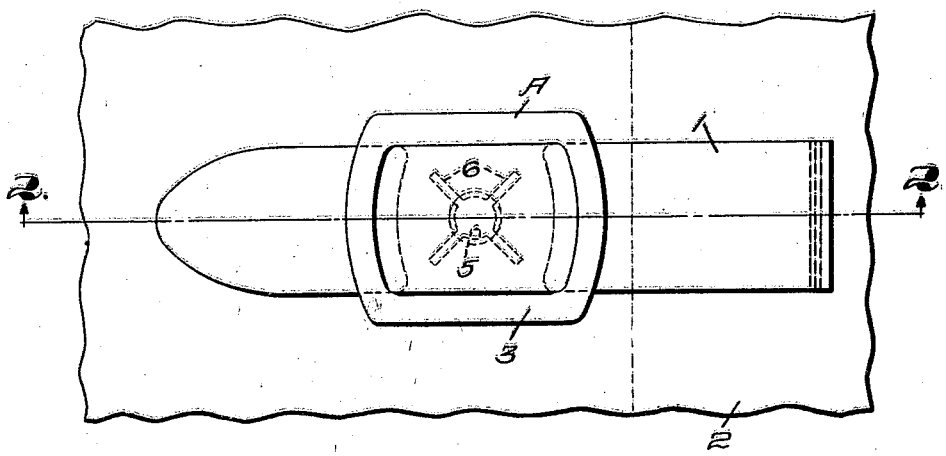
Fig. 2.
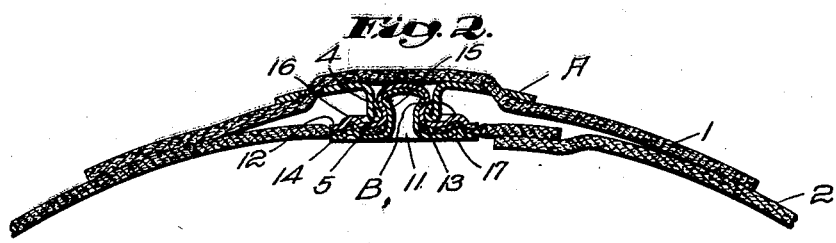
Fig. 3.                Fig. 4.                Fig. 5.
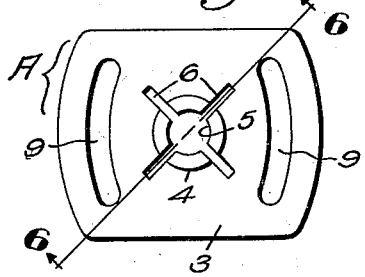    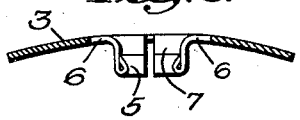    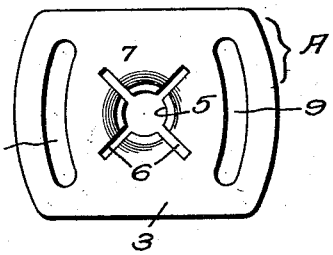
Fig. 7.    Fig. 6.
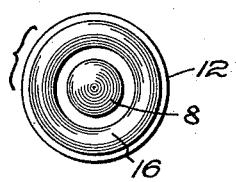
Inventor:
Louis E. Goddu
by Emery, Booth, Janney, & Varney
Att'ys Patented July 1, 1930

1,769,684

UNITED STATES PATENT OFFICE

LOUIS E. GODDU, OF WINCHESTER, MASSACHUSETTS, ASSIGNOR TO UNITED-CARR FASTENER CORPORATION, OF CAMBRIDGE, MASSACHUSETTS, A CORPORATION OF MASSACHUSETTS

SEPARABLE FASTENER

Application filed October 30, 1928. Serial No. 316,077.

My invention aims to provide improvements in separable fasteners and relates particularly to improvements in a slidable socket and in the attachment of a stud to a support.

In the drawings which illustrate a preferred embodiment of my invention:—

Figure 1 is a plan of a portion of an installation showing one use of my improved fastener;

Fig. 2 is a section taken on the line 2—2 of Figure 1;

Fig. 3 is an under side plan of the socket member;

Fig. 4 is a side elevation of the socket member;

Fig. 5 is a top plan of the socket;

Fig. 6 is a section of the socket taken on the line 6—6 of Fig. 3; and

Fig. 7 is a plan of the stud showing the embossed annular ring on the base.

Referring to my invention, as illustrated in the drawings, I have shown a separable snap fastener which is particularly, though not exclusively, adapted for use on gloves, overshoes and other articles where at least one of the fastener elements is carried by a strap and adjustable relative thereto. In the drawings the socket A is shown slidably attached to a strap 1 and the stud B is secured in fixed relation to its carrying medium 2.

The slidable socket A is pressed from a single piece of metal and comprises a plate portion 3 from which is pressed a tubular boss portion 4 having its free end bent inwardly within the boss to provide a rounded neck-engaging wall 5. The boss portion 4 and neck-engaging wall 5 are divided by a number of slits 6 which extend a substantial distance into the plate portion 3 thereby providing a number of yieldable fingers 7. Each finger is adapted to bend along a straight line passing through the plate portion between the ends of two of the slits 6, thereby to increase the resiliency of the fingers so that they will not become set over a long period of use. If the slits terminate in the boss portion the fingers are relatively stiff and are very likely to become set after they have been expanded a few times. The neck-engaging jaw portions, provided at the ends of the fingers 7 by the wall 5, present smooth surfaces for contact with the head 8 of the stud when the socket is being engaged therewith and disengaged therefrom.

At opposite sides of the boss portion 4 I have provided, in the plate portion 3, strap-receiving slots 9 (Figs. 1, 2 and 3) through which a strap may move to permit adjustment of the socket.

The stud installation includes the stud B, carrying medium 2 and attaching rivet 11, as shown in Fig. 2. The stud B has a base 12, the head 8 and neck 13. The rivet has a base 14 and a tubular rivet portion 15. When the stud B is secured to the carrying medium 2 by means of the rivet 11, nested embossed annular rings 16 and 17 (Figs. 2 and 7), formed in the bases of the stud and rivet, clench a portion of the carrying medium between them and dislodge the material from its normal plane. This means of attachment (Fig. 2) is very simple and durable and lateral stresses exerted upon the carrying medium 2 will not work the material loose from between the bases 12 and 14.

While I have illustrated and described my invention somewhat in detail, I do not wish to be limited thereby because the scope of my invention is best defined in the following claims.

Claims:

1. A slidable socket member of a snap fastener having a plate portion, a boss portion pressed out of the material of said plate portion, said boss portion being open to provide a stud-receiving aperture and being divided by a number of slits which terminate in said plate portion a substantial distance from where the boss portion joins the plate portion to divide said boss portion and a portion of said plate portion into a number of yieldable fingers for engagement with a cooperating stud, each of said fingers having its greatest yield occurring in the material of the plate portion and in a straight line from the end of one of said slits to the end of another at the junction of the finger and the plate portion thereby providing improved resiliency to said fingers and reducing the tendency of the fingers to become set, and strap-receiving slots located in said plate portion at opposite sides of said boss portion.

2. A slidable socket member of a snap fastener having a plate portion, a boss portion pressed out of the material of said plate portion, said boss portion being open to provide a stud-receiving aperture and being divided by a number of slits which terminate in said plate portion a substantial distance from where the boss portion joins the plate portion to divide said boss portion and a portion of said plate portion into a number of yieldable fingers for engagement with a cooperating stud, said fingers having their greatest yield occurring on straight lines through the material between the ends of said slits at the junction of the fingers and the plate portion thereby providing improved resiliency to said fingers and reducing the tendency of the fingers to become set, smoothly rounded neck-engaging jaw means presented at the free ends of said fingers and strap-receiving slots located in said plate portion at opposite sides of said boss portion.

3. A slidable socket member of a snap fastener having a plate portion, a boss portion pressed out of the material of said plate portion, said boss portion being open to provide a stud-receiving aperture and being divided by a number of slits which terminate in said plate portion a substantial distance from where the boss portion joins the plate portion to divide said boss portion and a portion of said plate portion into a number of yieldable fingers for engagement with a cooperating stud, said fingers having their greatest yield occurring on straight lines through the material between the ends of said slits at the junction of the fingers and the plate portion thereby providing improved resiliency to said fingers and reducing the tendency of the fingers to become set, inwardly and upwardly bent neck-engaging portions substantially parallel with the wall of the boss portion located at the free ends of the fingers and strap-receiving slots located in said plate portion at opposite sides of said boss portion.

In testimony whereof, I have signed my name to this specification.

LOUIS E. GODDU.